United States Patent [19]

Schock et al.

[11] Patent Number: 4,492,063
[45] Date of Patent: Jan. 8, 1985

[54] EXTRUDED PLASTICS MATERIAL HOLLOW PROFILED STRIP FOR WINDOW FRAMES, WINDOW FRAMES PRODUCED FROM THIS TYPE OF PROFILED STRIPS AND METHOD FOR THE PRODUCTION OF A WINDOW FRAME OF THIS TYPE

[75] Inventors: Karl Schock, Schorndorf; Lothar Frank, Plüderhausen, both of Fed. Rep. of Germany

[73] Assignee: Schock & Co. GmbH, Fed. Rep. of Germany

[21] Appl. No.: 363,882

[22] Filed: Mar. 31, 1982

[30] Foreign Application Priority Data

Apr. 15, 1981 [DE] Fed. Rep. of Germany ....... 3115254
Sep. 17, 1981 [DE] Fed. Rep. of Germany ....... 3136863

[51] Int. Cl.³ ............................................. E06B 1/28
[52] U.S. Cl. .............................. 52/309.7; 49/DIG. 2; 52/656
[58] Field of Search ............... 52/309.1, 309.7, 309.16, 52/656; 49/DIG. 1, DIG. 2

[56] References Cited

U.S. PATENT DOCUMENTS

| | | | |
|---|---|---|---|
| 3,352,060 | 11/1967 | Thams | 52/309.16 |
| 3,859,754 | 1/1975 | Budich et al. | 49/DIG. 2 |
| 4,189,520 | 2/1980 | Gauchel | 52/309.1 |
| 4,341,831 | 7/1982 | Kleiss | 52/309.7 |

FOREIGN PATENT DOCUMENTS

| | | | |
|---|---|---|---|
| 1659430 | 11/1972 | Fed. Rep. of Germany | 49/DIG. 1 |
| 1374761 | 11/1974 | United Kingdom | 49/DIG. 2 |

OTHER PUBLICATIONS

Schock Thermassiv, dated Mar. 1981, Schock & Co. GmbH, Window/Facade Products Group, P.O. Box 1540, Gmuender Str. 65, D-7060 Schorndorf, West Germany.

*Primary Examiner*—J. Karl Bell
*Attorney, Agent, or Firm*—Kenway & Jenney

[57] ABSTRACT

The invention relates to a glass fibre-reinforced, extruded plastics material hollow profiled strip for the production of window frames, glass doors, or the like. In order to be able to butt-weld profiled strips of this type together when producing the frame and to ensure a reliable bonding between the glass fibres and the plastics material of the profiled strips a synthetic resin is used as the bonding agent which causes this bonding, which synthetic resin has thermoplastic or thermoelastic properties and thus enables the glass fibres to be deflected during butt-welding and pressing together of the ends of the frame pieces.

13 Claims, 8 Drawing Figures

EXTRUDED PLASTICS MATERIAL HOLLOW PROFILED STRIP FOR WINDOW FRAMES, WINDOW FRAMES PRODUCED FROM THIS TYPE OF PROFILED STRIPS AND METHOD FOR THE PRODUCTION OF A WINDOW FRAME OF THIS TYPE

The invention relates to an extruded plastic material hollow profiled strip for window frames with a profile body which consists at least substantially of a thermoplastics material and at least one profile wall of which is provided with at least one reinforcement element which is integrally connected to the profile plastics material.

Hollow profiled strips made purely from plastics material do not have sufficient strength and rigidity for the production of window frames, however they have a considerable temperature linear expansion, in particular during insolation. For this reason a wide variety of methods have been attempted with respect to the reinforcement of this type of plastics material hollow profiled strips: insertion of a wood core or a core made from a metal hollow profile into the plastics material hollow profiled strips or embedding resinoid-bonded glass fibre bars in the cavity of the profiled strips and subsequently filling the latter with a hardening plastics material (THERMASSIV-window profiles of Schock GmbH). Apart from the fact that inserted wood or metal cores are unsatisfactory owing to the lack of connection with the plastics material hollow profile and owing to the corrodibility of the metal profiles, the reinforcements described involve considerable difficulties if it is desired to butt weld the profiled strips with one another at the frame corners on modern plastics material precision welding machines when producing the window frames.

The invention was based on the object of developing a relatively cheap plastics material hollow profiled strip for the production of window frames which is more suitable for the production of window frames, owing to its physical properties (temperature expansion coefficient, strength, rigidity, temperature stability and heat expansion), than the known profiled strips and which, nevertheless, may be simply butt-welded during manufacture of the frames. Taking as a starting point a profiled strip of the initially-mentioned type this object may be solved in accordance with the invention in that the reinforcement element consists of resinoid-bonded reinforcement fibres and its bonding agent is a thermoplastics material or a synthetic resin which has thermoelastic properties which bonding agent softens at the welding temperature of the profile plastics material such that the reinforcement fibres may be deflected. The term "reinforcement fibres" also includes mono- and multi-filaments, and glass fibre rovings are preferably used. The bonding agent used in accordance with the invention for the reinforcement element(s) enables the frame pieces, produced from hollow profiled strips according to the invention, to be butt-welded to one another without having to remove the reinforcement elements a short distance away from the front faces of the frame pieces, since the ends of the reinforcement fibres may be deflected during butt-welding and pressing together of the frame pieces. In this way the manufacturing expenditure is considerably reduced. The hollow profiled strips according to the invention moreover lead to frames with greater bending strength since the reinforcement fibres extend into the weld seams. Since the primary requirement of the bonding agent of the reinforcement fibres is therefore simply that it allows a deflection of the reinforcement fibres during heating of the profile body plastics material in the course of butt-welding, such that reinforcement fibres do not prevent the pressing together of the frame pieces which are to be bonded together and the necessary formation of weld beads, any low-molecular, duroplastic synthetic resin having thermoplastic or thermoelastic properties is in principle suitable for the bonding agent for the reinforcement fibres. A bonding agent from the group of the unsaturated polyesters, epoxy or acrylic resins is preferred since these bond well with the plastics materials, such as PVC, PE or ABS, which are preferred for the extruded hollow profiled strips.

The profiled strips according to the invention may, however, also be manufactured relatively cheaply since the reinforcement fibres which have been impregnated with synthetic resin may be bonded to the profiled body during extrusion of the hollow profiled strips, by allowing the reinforcement element(s) to run into the extrusion tool for the manufacture of the profiled strips.

The reinforcement elements themselves may be manufactured in such a way that the reinforcement fibres, e.g. the glass fibre rovings, are firstly led through a bath consisting of a synthetic resin which adheres well to the reinforcement fibres and connects to, in particular bonds by welding with, the profile body plastics material during extrusion of the hollow profiled strips. In this connection the bonding agent may be of the type such that the hardening of the resin is only triggered during a subsequent heat treatment, whereupon the bonding agent becomes soft again during extrusion of the profiled strips and during welding of the frame corners. Suitably there are used as bonding agents synthetic resins whose hardening occurs as a result of normal cross-linking without a substantial transverse cross-linking. One example of a suitable bonding agent is a resinous solution of MMA and PMMA in a ratio such that a polymer content of approximately 20 to 30% results, with a hot setting agent for example benzoyl peroxide.

In order to increase the rigidity of the plastic material hollow profiled strips in question it may be recommended that reinforcing bands or resinoid-bonded glass fibres, such as are already available on the market, are used as reinforcement elements, since glass fibre bands of this type are processed for example during the manufacture of plastic skis. The glass fibres may be in the form of rovings extending in the longitudinal direction of the band, or in the form of woven webs, non-woven fabric or the like. Glass fibre bands of this type may be cemented or welded onto the surface of the hollow profiled strips since in this way the greatest effect with respect to the increase in rigidity is obtained, owing to the great distance of the bands from the neutral axis; in a preferred embodiment the reinforcement elements or glass fibre bands are, however, embedded in the profile wall plastics material and are surrounded thereby on all sides.

It is finally recommended that the cavity of the profile is filled at least partially with a plastics material light foam of low density, in particular PU-light foam, in order to further improve the heat transition value of the profiled strips. A filling of this type does not prevent butt-welding since the foam of the frame pieces may very easily be pressed back, with a correspondingly shaped punch, from the front faces of the profiled strips into the interior of the profile before welding.

If the reinforcement elements are disposed in the hollow profiled strip at a transverse spacing from one another such that there are longitudinal regions formed between them by the profile plastics material, this leads to particularly rigid frames since the profile plastics material then forms plastics material bridges in the welding seam planes between the reinforcement members.

In order to produce a window frame from the profiled strips according to the invention it is in principle possible to proceed as in the case of known operations with the butt-welding machines which are available on the market: The profiled strips are heated in the region of the front faces, for example, their mitre sectional areas, and are then pressed together with these front faces and, during welding of a frame corner, in each case two covers are pressed against those profile walls of each strip which form the outer side and the inner side of the frame, the covers of corresponding walls initially forming a gap between themselves, which releases the front faces, and are moved towards each other when the front faces are pressed against each other, these covers being moved towards each other in accordance with the invention in such a manner that, when the profile front faces are pressed against each other, the reinforcement fibres, together with the greatest part of the profile body plastics material which is thereby displaced, is urged towards the interior of the profiled strip. In this manner the appearance of the reinforcement fibres at the welding seams after the welding beads formed during welding at the surface of the frame have been cut off is vie.

A frame produced in this way in accordance with the invention from profiled strips according to the invention is therefore characterized in that the reinforcement fibres at the weld seams are essentially deflected in the direction towards the interior of the profiled strips.

Of course the invention may not only be applied to the outer pieces of window frames but also to so-called impost profiles.

As well as avoiding the above-mentioned disadvantages of the prior art, the construction of a plastics material hollow profiled strip according to the invention also leads to the following advantages: No preliminary operations at all are necessary for butt-welding; the profile has a very low thermal linear expansion and may be formed in such a way that when it is warmed on one side, for example, by insolation, it only distorts to a minimum extent; there is no danger of rusting; the manufacturing cost of window frames according to the invention is very favourable; no metal chips result when the profiled strips according to the invention are cut to length; the reinforcement elements to be processed, including the glass fibre bands already mentioned, are already available on the market and they do not have the disadvantage that they draw off heat from the welding point during butt-welding, owing to their low thermal conductivity.

Further features, advantages and details of the invention will appear from the enclosed claims and/or the enclosed drawings as well as the subsequent description of several embodiments of profiled strips according to the invention and one embodiment of the welding process for manufacturing frame corners; in the enclosed drawings:

Figure 1:
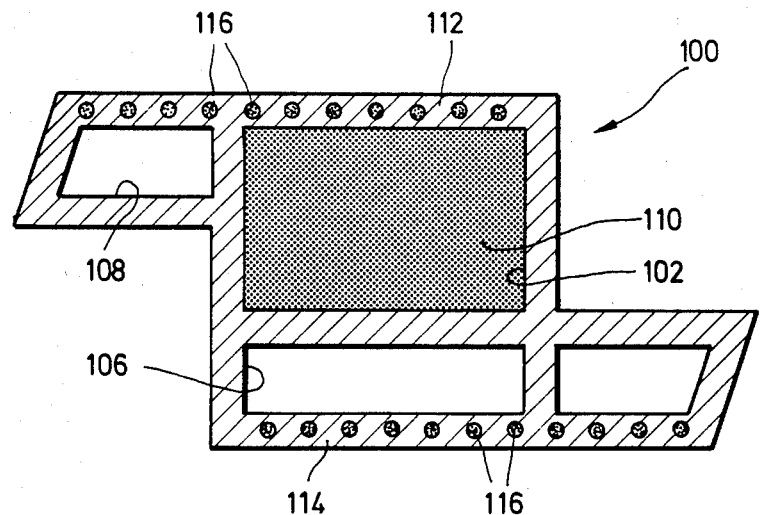
FIG. 1 is a cross-section through a first embodiment of the profiled strip according to the invention, with individual reinforcement elements inserted in two profile walls.

FIG. 1 shows a plastics material hollow profile 100 with a plurality of hollow chambers 102, 104, 106 and 108, of which hollow chamber 102 is filled with a polyurethane light foam core 110. In the profile walls 112 and 114, which will subsequently form the outer and inner side of a window frame, concealed reinforcement elements 116 are embedded which extend in the longitudinal direction of the strip and are glass fibre rovings impregnated with synthetic resin, acrylic resins being used as the bonding agent for the glass fibres.

Figure 2:
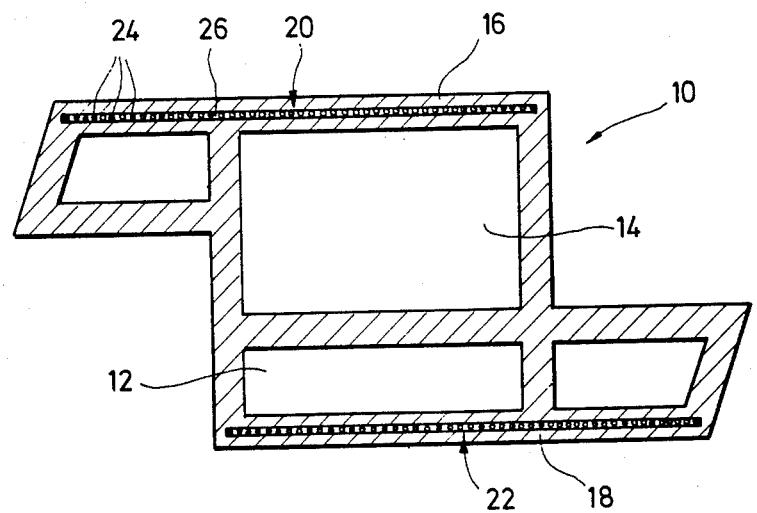
FIGS. 2–5 show cross-sections through four further embodiments of the profiled strip according to the invention with reinforcement bands consisting of resinoid-bonded glass fibres.

FIG. 2 shows a plastics material hollow profile 10 with hollow chambers 12 and 14 in whose profile walls 16 and 18 forming the outer and inner sides of the frame glass fibre bands 20 and 22 are subsequently embedded. These consist, for example, of glass fibre rovings 24 and an acrylic resin bonding agent 26. In the embodiment according to FIG. 2 the glass fibre bands 20, 22 are embedded in the plastics material of the profile walls, the layer of plastics material inside the glass fibre bands preferably being thinner than the layer of plastics material forming the outer side.

Figure 3:
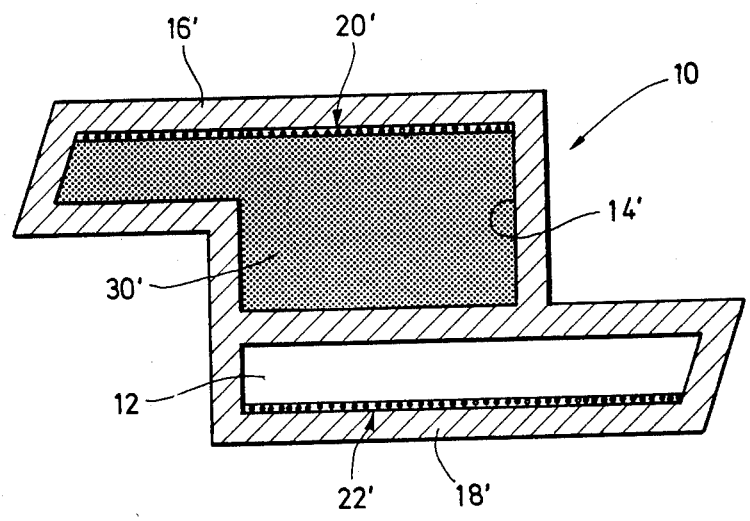

The embodiment according to FIG. 3 differs from the embodiment according to FIG. 2 only in that the glass fibre bands 20' and 22' are located in the inner side of the profile walls 16' and 18' and that there is a polyurethane light foam core 30' in the hollow chamber 14'.

Figure 4:
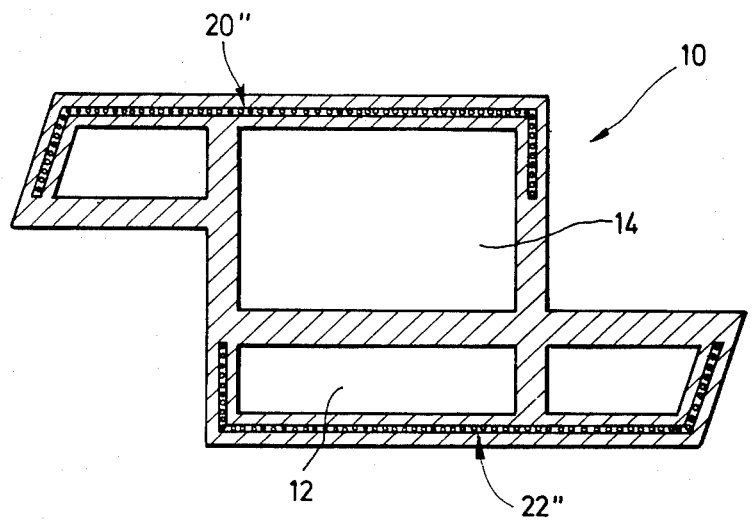

As can be seen from the embodiment according to FIG. 4 glass fibre bands 20" and 22" used in accordance with the invention may also be bent during the extrusion of the plastics material hollow profile.

Figure 5:
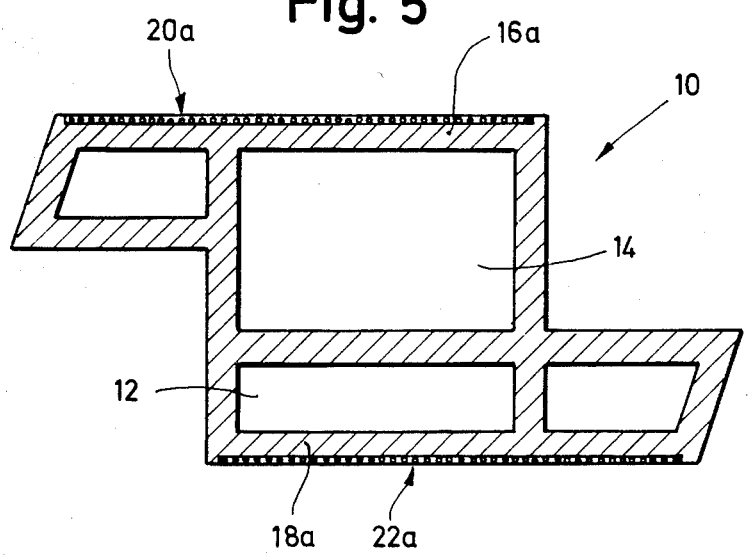

Finally the embodiment according to FIG. 5 is to show that the glass fibre bands 20a and 22a to be used according to the invention may also be placed on the outer surfaces of the profile walls 16a and 18a and it is even possible to stick on the glass fibre bands after extrusion.

Figure 6:
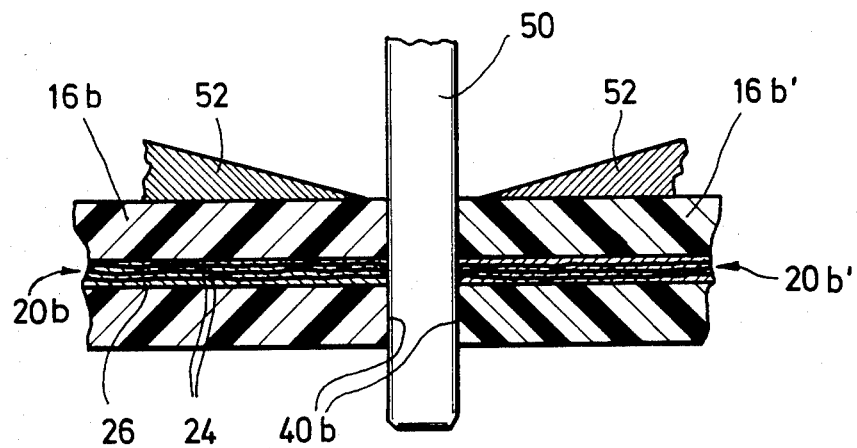
FIGS. 6 and 7 show schematic illustrations of the welding process.
Figure 7:
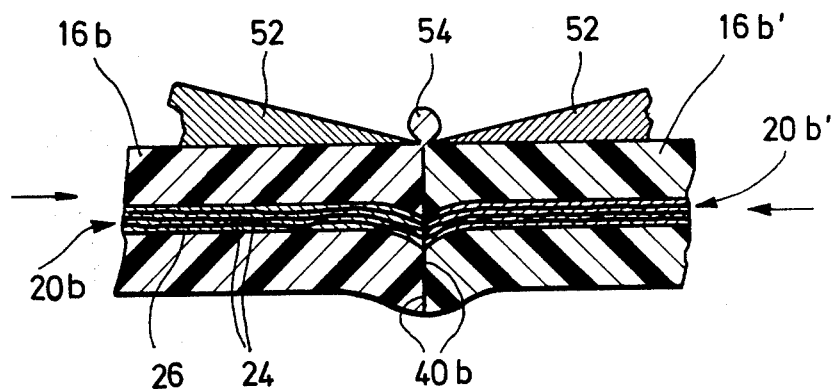

FIGS. 6 and 7 show the butt-welding according to the invention and the construction of a welding point according to the invention.

FIG. 6 shows profile walls 16b and 16b' of two plastics material hollow profiled strips according to the invention, the front faces 40b of which strips are to be butt-welded together. In these profile walls there are glass fibre bands 20b and 20b' according to the invention.

As is usual in the known type of plastics material butt-welding machines, for example in the automatic butt-welding machines HASSOMAT ZLN 2 of Hassomat Maschinenbau GmbH & Co., Helbingstrasse 63, D-2000 Hamburg 70, firstly for welding a so-called welding reflector 50 (a heated metal blade with polished surfaces) is inserted between the front faces 40b, which are to be joined together, in order to heat the plastics material of the actual plastics material hollow profile so strongly that it becomes at least a pasty consistency; at these temperatures the synthetic resin bonding agent of the glass fibre bands according to the invention should likewise become flexible in a plastic or elastic manner. The above-mentioned butt-welding machines have on both sides of the welding point blades which also act as covers and are designated 52: The cutting edges of these blades are firstly at a distance from the front faces 40b of the profiles.

After the plastics material has been heated to a sufficient degree the welding reflector 50 is pulled out from the gap between the ends of the profiled strips whereupon the front faces of the profiled strips which are to be bonded together are pressed against each other. Simultaneously the blades 52 are moved together, which results in the following:

In order to obtain a qualitatively high-grade welding joint the ends of the profiled strips should be urged together is such a way that the plastics material is displaced laterally. However, the blades 52 prevent the plastics material being displaced outwardly to the same extent as into the interior of the profile, on the contrary they cause the predominant part of the plastics material, which is displaced during the butt-welding process, to be displaced into the interior of the profiled strips together with the glass fibre bands 20b and 20b' which extend as far as the front faces 40b, whereas only a small plastics material bead 54 is formed between the cutting edges of the blades 52 which have been moved together at least approximately, which bead 54 may readily be cut off subsequently.

Thus the glass fibres of the glass fibre bands are prevented from appearing at the surface of the frame during the butt-welding.

If the blades 52 which act as covers are dispensed with the glass fibres of the reinforcement elements 116 or the glass fibre rovings 24 fan out essentially in all directions in the welding seam plane formed by the front faces 40b, as is the case with a paintbrush which is pushed flush onto a surface.

Figure 8:
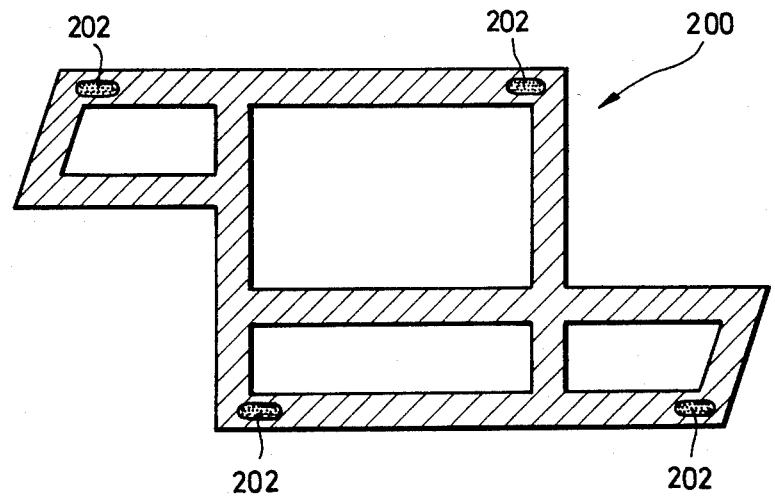
FIG. 8 shows a cross-section similar to FIG. 1 through a particularly advantageous embodiment of the profiled strip according to the invention.

Finally, FIG. 8 shows a plastics material hollow profile 200 with glass fibres or glass fibre rovings which are impregnated with synthetic resin, are combined to form reinforcement elements 202 and are delivered to the extrusion tool during extrusion of the hollow profile, namely with a synthetic resin bonding agent which either has already hardened or is to be hardened. According to a further feature of the invention the reinforcement elements 202 are disposed in the four corners of the profile 200 and have cross-section dimensions which are preferably approximately 8×3 mm.

We claim:

1. Extruded plastics material profiled strip for butt-welded window frames, said strip having a profile body with profile walls forming a longitudinal chamber and consisting at least essentially of a thermoplastics material, at least one profile wall being provided with a reinforcement element which is integrally connected to said profile wall, characterized in that the reinforcement element consists of reinforcement fibres bonded to each other by a synthetic resin cement selected from the group comprising synthetic resins having thermoplastic properties and synthetic resins that manifest thermoelastic properties at the welding temperature of said profile walls so that the reinforcement fibres can be deflected during butt-welding and said reinforcement element being continuous and separate from said thermoplastic material forming said profile walls and said reinforcement element extending along said profile wall throughout its length.

2. Profile strip according to claim 1, characterized in that the thermoplastics material of the profile body is PVC, PE or acrylonitrile-butadiene-styrene plastics (ABS polymers).

3. Profiled strip according to claim 1 characterized in that the bonding agent is an acrylic resin, an unsaturated low-molecular polyester, an epoxy resin, a linear polyester or a linear polyurethane.

4. Profiled strip according to claim 1, characterized in that the bonding agent softens at approximately 250° such that the reinforcement fibres may be deflected.

5. Profiled strip according to claim 1, characterized in that the reinforcement elements are formed by reinforcement bands of resinoid-bonded glass fibres.

6. Profiled strip according to claim 1, characterized in that the reinforcement elements are fuse-welded to the profile body.

7. Profiled strip according to claim 1, characterized in that the reinforcement elements are embedded in the profile wall and are surrounded on all sides by the profile plastics material.

8. Profiled strip according to claim 7, characterized in that a plurality of reinforcement elements are disposed at a transverse distance from each other such that between them there are longitudinal regions formed by the profile plastics material.

9. Profiled strip according to claim 1, characterized in that the profile cavity is filled at least partially with a plastics material light foam of low density, preferably with PU light foam.

10. Window frame produced from profiled strips according to claim 1 with frame pieces butt-welded together along their front faces, in particular along mitre sectional areas, characterized in that the reinforcement fibres extend into the weld seams of the frame and are deflected there towards the direction of the respective weld seam plane.

11. Frame according to claim 10, characterized in that the reinforcement fibres at the weld seams are essentially deflected towards the interior of the profiled strips.

12. Frame according to claim 10, characterized in that in the weld seam planes the plastics material of the profile forms plastics material bridges between the reinforcement elements.

13. Method of producing a frame according to claim 10, in which the profiled strips are heated in the region of their front faces and are then pressed with the latter against each other and, during welding of a frame corner, in each case two covers are pressed against those profile walls of each strip which form the outer and inner sides of the frame, of the profiled strips to be connected to one another, the covers of corresponding walls initially forming between themselves a gap releasing the front faces of the profiled strips and are moved towards each other when these front faces are pressed against each other, characterized in that the covers are moved towards each other in such a way that when the front faces of the profiled strips are pressed against each other the reinforcement fibres, together with the larger part of the profile wall plastics material which is thereby displaced, is urged in that direction towards the interior of the profiled strips.

* * * * *